United States Patent [19]
Holender et al.

[11] Patent Number: 6,104,699
[45] Date of Patent: Aug. 15, 2000

[54] METHOD AND DEVICE FOR PARTITIONING PHYSICAL NETWORK RESOURCES

[75] Inventors: Wlodek Holender, deceased, late of Lund, Sweden, by Kerstin Korning, legal representative; Tamas Henk, Budapest, Hungary; Soren Blaabjerg, Allerod, Denmark; Andràs Faragó, Budapest, Hungary; Bengt Stavenow, Lund, Sweden

[73] Assignee: Telefonaktiebolget LM Ericsson, Stockholm, Sweden

[21] Appl. No.: 08/765,159

[22] PCT Filed: Jun. 12, 1995

[86] PCT No.: PCT/SE95/00703

§ 371 Date: Apr. 29, 1997

§ 102(e) Date: Apr. 29, 1997

[87] PCT Pub. No.: WO95/34973

PCT Pub. Date: Dec. 21, 1995

[30] Foreign Application Priority Data

Jun. 13, 1994 [SE] Sweden .................................. 9402059

[51] Int. Cl.[7] .................................................. H04L 12/24
[52] U.S. Cl. .......................... 370/235; 370/252; 370/254; 370/396; 709/221
[58] Field of Search ..................................... 370/225, 228, 370/229, 235, 237, 238, 254, 255, 351, 389, 395, 396, 400, 401, 409, 904, 905, 252, 522, 524, 397, 465; 340/825.03, 826, 827; 379/219–221, 271–273; 706/10, 14, 15, 19, 27; 709/201, 220, 221, 232, 234, 235, 238, 239, 241

[56] References Cited

U.S. PATENT DOCUMENTS 4,669,113  5/1987  Ash et al. ............................... 379/221
4,713,806  12/1987 Oberlander et al. ..................... 370/358
5,289,303  2/1994  Cloonan et al. ......................... 359/139
5,297,137  3/1994  Ofek et al. .............................. 370/403
5,345,444  9/1994  Cloonan et al. ......................... 370/381
5,381,404  1/1995  Sugano et al. .......................... 370/238
5,687,292  11/1997 Boda et al. ............................... 395/11
5,764,740  6/1998  Holender .................................. 379/112
5,872,918  2/1999  Malomsoky et al. ................ 395/200.5

FOREIGN PATENT DOCUMENTS 0 608 981 A2  8/1994  European Pat. Off. .
0 608 981 A3  8/1994  European Pat. Off. .
635 958 A2   1/1995  European Pat. Off. .
2 253 970    9/1992  United Kingdom .

OTHER PUBLICATIONS

T. Haduong et al., "Stratified Reference Model an Open Architecture Approach for B–ISDN", International Switching Symposium, Stockholm, Sweden, May 27—Jun. 1, 1990, vol. III, pp. 115–121.

(List continued on next page.)

Primary Examiner—Alpus H. Hsu
Attorney, Agent, or Firm—Burns, Doane, Swecker & Mathis, L.L.P.

[57] ABSTRACT

A method and device partition physical transmission resources of a physical network. At first, a set of logical networks is established on top of the physical network. The logical networks comprise nodes and logical links extending between the nodes so as to form the logical networks. The logical links are used by routes. Next, the capacities of the logical links of the logical networks are determined such that the route blocking probability on each individual route in each one of the logical networks is less than or equal to a maximum allowed blocking probability for each individual route. This is realized by distributing, for each individual route, the route blocking evenly among the logical links used by the individual route. Finally, the physical transmission resources are allocated among the logical links of the logical networks according to the determination.

15 Claims, 6 Drawing Sheets

OTHER PUBLICATIONS

J.P. Labourdette, "Blocking Probabilities in Multitraffic Loss Systems: Insensitivity, Asymptotic Behavior, and Approximations", IEEE Transactions on Communications, vol. 40., No. 8, Aug. 1992, pp. 1355–1366.

M. MacGregor et al., "Connectability: A Performance Metric For Reconfigurable Transport Networks", IEEE Journal on Selected Areas in Communications, vol. 11., No. 9, Dec. 1993, pp. 1461–1469.

A. Hiramatsu, "Integration of ATM Call Admission Control and Link Capacity Control by Distributed Neural Networks", IEEE Journal on Selected Areas in Communications, vol. 9, No. 7, Sep. 1991, pp. 1131–1138.

G. Gopal et al., "Dynamic Network Configuration Management", IEEE International Conference on Communications, Atlanta, vol. 2, Apr. 1990, pp. 295–301.

METHOD AND DEVICE FOR PARTITIONING PHYSICAL NETWORK RESOURCES

TECHNICAL FIELD OF THE INVENTION

The present invention relates to telecommunication networks and in particular to the partitioning of physical network resources.

BACKGROUND ART

A main characteristic of a modern telecommunication network is its ability to provide different services. One efficient way of providing said services is to logically separate the resources of a physical network—resource separation (see FIG. 1). On top of a physical network PN there is established a number of logical networks LN, also referred to as logical or virtual subnetworks, each of which comprises nodes N and logical links LL interconnecting the nodes. Each logical network forms a logical view of parts of the physical network or of the complete physical network. In particular, a first logical network LN1 comprises one view of parts of the physical network and a second logical network LN2 comprises another view, different from that of the first logical network. The logical links of the various logical networks share the capacities of physical links present in said physical network.

A physical network comprises switches S (physical nodes) or equivalents, physical links interconnecting said switches, and various auxiliary devices. A physical link utilizes transmission equipment, such as fiber optic conductors, coaxial cables or radio links. In general, physical links are grouped into trunk groups TG which extend between said switches. There are access points to the physical network, to which access points access units such as telephone sets, computer modems are connected. Each physical link has limited transmission capacity.

FIG. 2 is a simple schematic drawing explaining the relationship between physical links, logical links and also routes. A simple underlying physical network with physical switches S and trunk groups TG, i.e. physical links, interconnecting the switches is illustrated. On top of this physical network a number of logical networks are established, only one of which is shown in the drawing. The logical networks can be established by a network manager, a network operator or other organization. In our Swedish Patent Application 9403035-0, incorporated herein by reference, there is described a method of creating and configuring logical networks. The single logical network shown comprises logical nodes N1, N2, N3 corresponding to physical switches S1, S2 and S3 respectively. Further the logical network comprises logical links LL interconnecting the logical nodes N1–N3. A physical link is logically subdivided into one or more logical links, each logical link having an individual traffic capacity referred to as logical link capacity. It is important to note that each logical link may use more than one physical link or trunk group. To each node in each logical network there is usually associated a routing table, which is used to route a connection from node to node in the particular logical network starting from the node associated with the terminal that originates the connection and ending at the node associated with the terminal which terminates said connection. Said nodes together form an origin-destination pair. A node pair with two routes is also illustrated. One of the routes is a direct route DR while the other one is an alternative route AR. In general, the links and the routes should be interpreted as being bidirectional.

In order to avoid misconceptions the following definitions will be used: A route is a subset of logical links which belong to the same logical network, i.e. a route have to live in a single logical network. Note that it can be an arbitrary subset that is not necessarily a path in the graph theoretic sense. Nevertheless, for practical purposes, routes are typically conceived as simple paths. The conception of a route is used to define the way a connection follows between nodes in a logical network. A node pair in a logical network, the nodes of which are associated with access points, is called an origin-destination (O-D) pair. In general, all node pairs in a logical network are not O-D pairs, but instead some nodes in a logical network may be intermediate nodes to which no access points are associated. A logical link is a subset of physical links.

Information, such as voice, video and data, is transported in logical networks by means of different bearer services. Examples of bearer services are STM 64 (Synchronous Transmission Mode with standard 64 kbit/s), STM 2 Mb (Synchronous Transmission Mode with 2 Mbit/s) and ATM (Asynchronous Transfer Mode). From a service network, such as PSTN (Public Switched Telephone Network) and B-ISDN (Broadband Integrated Services Digital Network), a request is sent to a logical network that a connection should be set up in the corresponding logical network.

Although the physical network is given, it is necessary to decide how to define a set of logical networks on top of the physical network and how to distribute or partition said physical network resources among the logical networks by subdividing physical link capacities into logical link capacities associated with said logical networks. Since the logical networks share the same given physical capacities, there is a trade-off between their quality: GoS (Grade of Service) parameters, call blocking probabilities etc. can be improved in one of the logical networks only at the price of degrading the quality in other logical networks. When considering a large and complex physical telecommunication network a considerable amount of logical links will exist, said logical links sharing the capacities of the physical network. It is not at all an easy task to design a method for partitioning physical network resources among logical networks which does not require substantial computational power. In accordance with the present invention there is proposed a strikingly simple and straightforward method for resource partitioning, the computational complexity of which method is very small.

SUMMARY OF THE INVENTION

On top of a physical network a number of logical networks are established in which logical links, used by routes, share the same physical transmission and switching resources. There are several reasons for logically separating physical resources. Logical resource separation for offering different Grade of Service classes, virtual leased networks with guaranteed resources and peak rate allocated virtual paths are some examples of interesting features in the design, dimensioning and management of physical networks. However, it is still necessary to decide how to distribute or partition said physical network resources among the logical networks. In general, the determination of this resource partitioning requires substantial computational power.

In accordance with a main aspect of the present invention there is provided a computationally very simple method for partitioning physical network resources among logical networks.

In accordance with a first aspect of the invention there is provided a method for resource partitioning, in which a set of logical networks is established on top of a physical network comprising physical transmission and switching resources, said logical networks comprising nodes and logical links extending between the nodes so as to define the topology of said logical networks. The logical links are used by routes interconnecting the nodes of node pairs in the logical networks. Logical link capacities are determined such that the route blocking probability on each individual route in each one of the logical networks is less than or possibly equal to a maximum allowed blocking probability, given for each individual route, by distributing the route blocking evenly among the logical links used by the respective route. Finally, the physical transmission resources are allocated among the logical links of the logical networks according to the determined logical link capacities.

In accordance with a second aspect of the invention there is provided a device for partitioning physical transmission resources among logical networks.

BRIEF DESCRIPTION OF THE DRAWINGS

The novel features believed characteristic of the invention are set forth in the appended claims. The invention itself, however, as well as other features and advantages thereof, will be best understood by reference to the detailed description of the specific embodiments which follows, when read in conjunction with the accompanying drawings, wherein:

PREFERRED EMBODIMENTS OF THE INVENTION

An important tool in network management, particularly the management and dimensioning of large ATM networks, is the distribution of resources of a physical network among logical networks that share the capacity of the physical network. There are several advantages of logical resource separation:

It has gradually been recognized in the last couple of years that it is not at all easy to integrate services with very different demands to e.g. bandwidth, grade of service or congestion control functions. In some cases it turn out to be better to support different services by offering separate logical networks, and limiting the degree of integration to only partial rather than complete sharing of physical transmission and switching resources. Network management can be simplified if service classes are arranged into groups in such a way that only those of similar properties are handled together in a logical network. For example, delay sensitive and loss sensitive service classes can possibly be managed and switched easier if the two groups are handled separately in different logical subnetworks, rather than all mixed on a complete sharing basis. Moreover, in this way they can be safely handled on call level without going down to cell level as e.g. in priority queues. Of course, within a logical network statistical multiplexing, priority queuing and other mechanisms can still be applied among service classes that already have not too different characteristics;

Important structures such as virtual leased networks, required by large business users, and virtual LAN's are much easier to implement;

A Virtual Path (VP), a standardized element of ATM network architecture, can be considered as a special logical network;

The physical network operates more safely.

Figure 1:
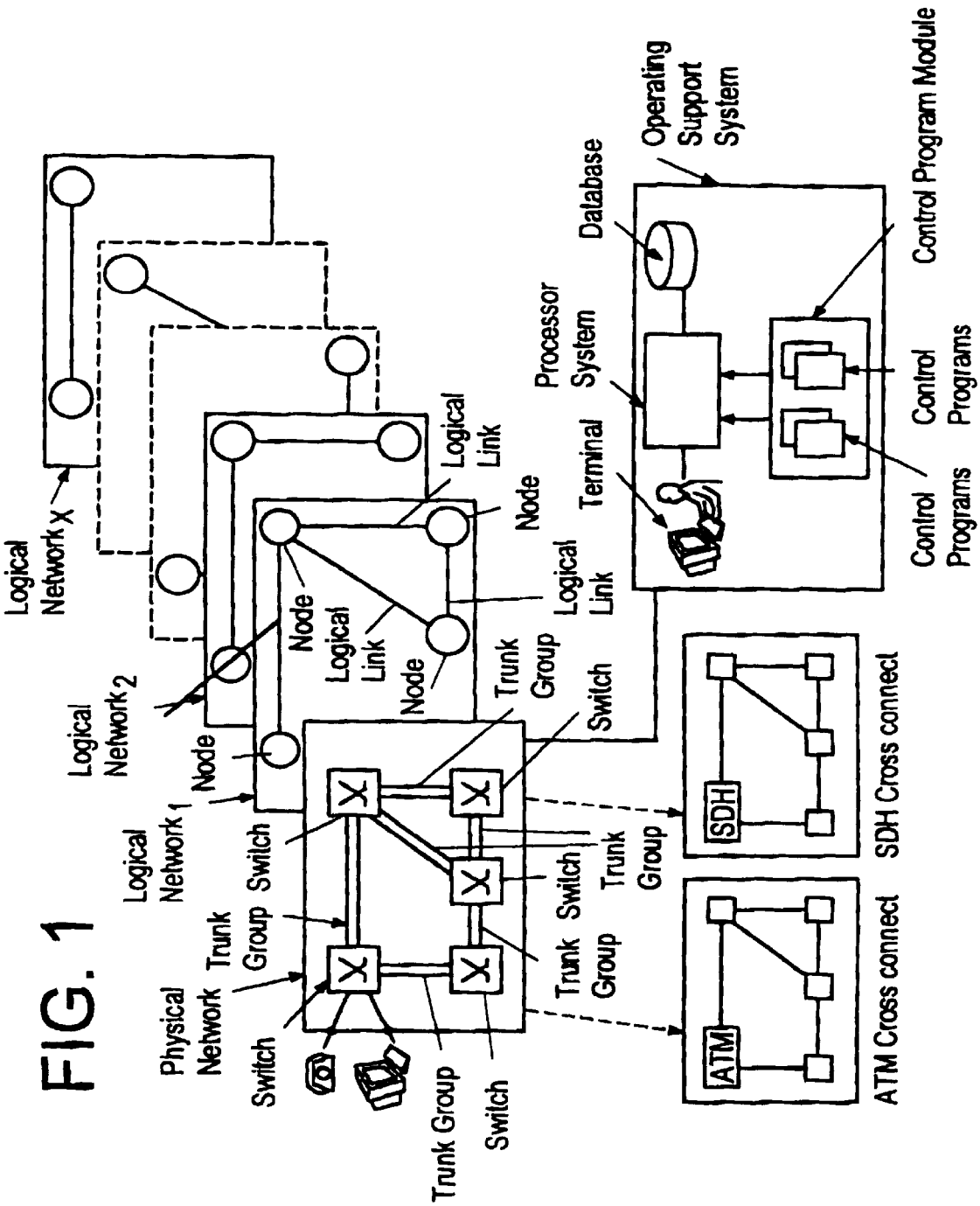
FIG. 1 shows a physical network, on top of which a number of logical networks are established, and an operation and support system (OSS) which controls the operation of the overall network.
Figure 2:
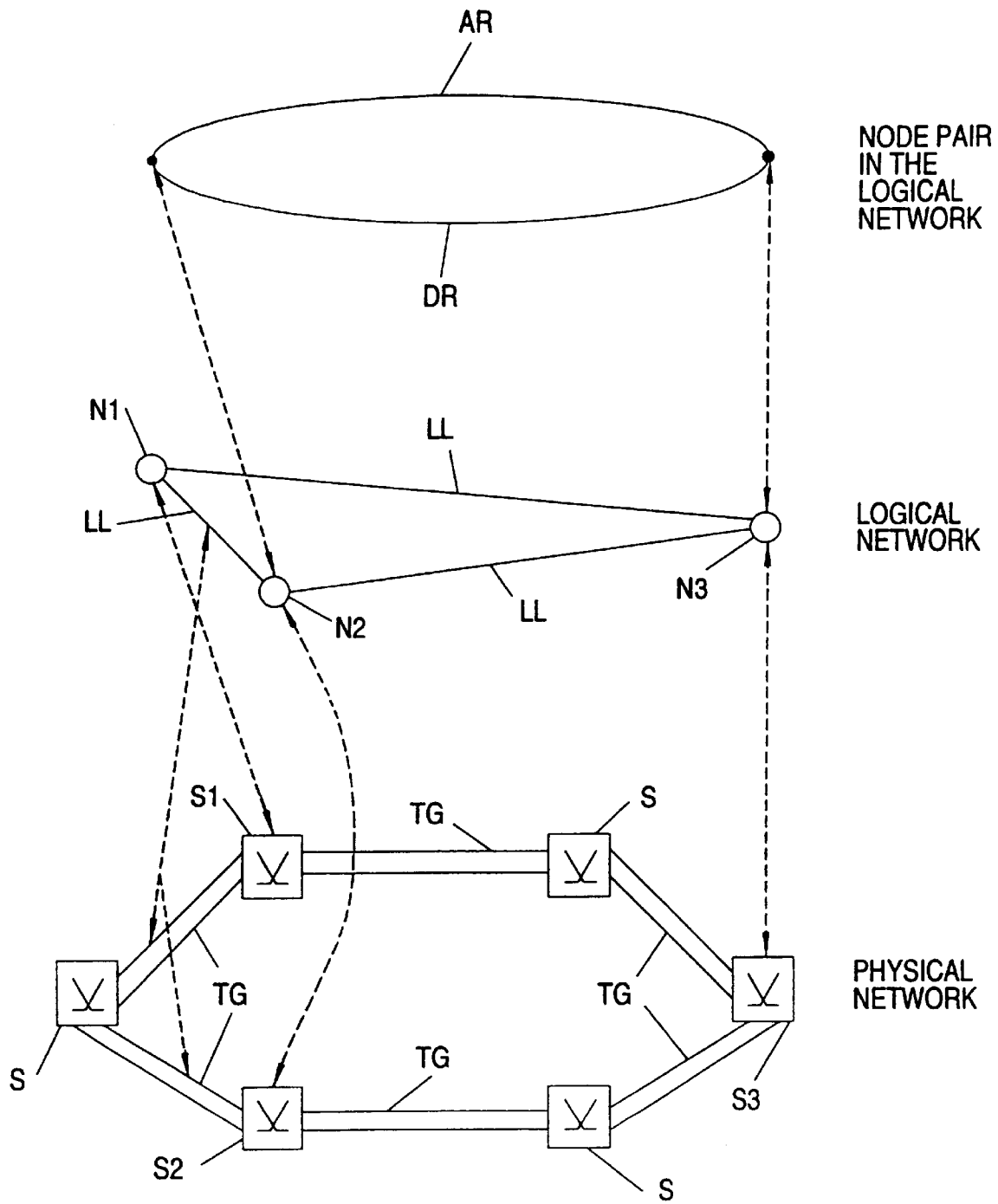
FIG. 2 is a schematic drawing explaining the relationship between physical links and switches, logical links and nodes, and also routes.

A physical network, e.g. a large telecommunication network, with physical resources is considered. In FIG. 1 there is illustrated a physical network PN on top of which a set of logical networks LN1, LN2, . . . , LNX (assuming there are X logical networks) is established. Each logical network comprises nodes N and logical links LL interconnecting the nodes. The topology of these logical or virtual networks will in general differ from the topology of the underlying physical network.

The network system is preferably controlled by an operation and support system OSS. An operation and support system OSS usually comprises a processor system PS, terminals T and a control program module CPM with a number of control programs CP along with other auxiliary devices. The architecture of the processor system is usually that of a multiprocessor system with several processors working in parallel. It is also possible to use a hierarchical processor structure with a number of regional processors and a central processor. In addition, the switches themselves can be equipped with their own processor units in a not completely distributed system, where the control of certain functions are centralized. Alternatively, the processor system may consist of a single processor, often a large capacity processor. Moreover, a database DB, preferably an interactive database, comprising e.g. a description of the physical network, traffic information and other useful data about the telecommunication system, is connected to the OSS. Special data links, through which a network manager/operator controls the switches, connect the OSS with those switches which form part of the network system. The OSS contains e.g. functions for monitoring and controlling the physical network and the traffic.

From this operation and support system OSS the network manager establishes a number of logical networks on top of the physical network by associating different parts of the traffic with different parts of the transmission and switching resources of the physical network. This can e.g. be realized by controlling the port assignment of the switches and cross connect devices of the physical network, or by call admission control procedures. The process of establishing logical networks means that the topology of each one of the logical networks is defined. In other words, the structure of the nodes and logical links in each logical network is determined.

Conveniently, traffic classes are arranged into groups in such a way that those with similar demands to bandwidth are handled together in a separate logical network. By way of example, all traffic types requiring more than a given amount of bandwidth can be integrated in one logical network, and those traffic types that require less bandwidth than this given amount can be integrated in another logical network. In other words, the two traffic groups are handled separately in different logical subnetworks. In particular, this is advantageous for an ATM network carrying a wide variety of traffic types. However, in one embodiment of the present invention, each individual traffic type is handled in a separate logical network.

Figure 3:
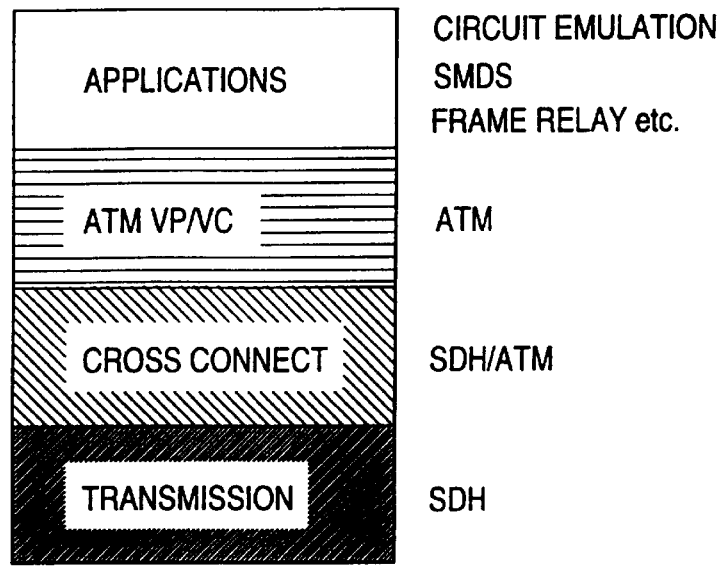
FIG. 3 is a schematic drawing of a B-ISDN network from the viewpoint of the Stratified Reference Model.
Figure 3:
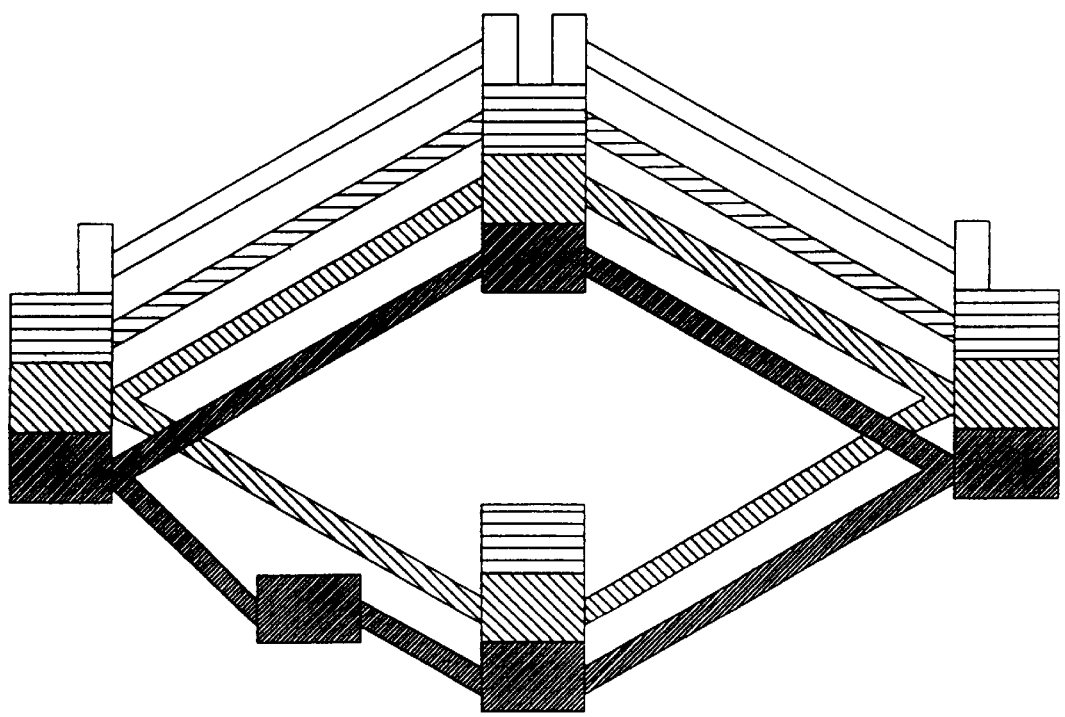

Preferably, the present invention is applied in the B-ISDN (Broadband Integrated Services Digital Network) network environment. A fully developed B-ISDN network will have a very complex structure with a number of overlaid networks. One conceptual model suitable of describing overlaid networks is the Stratified Reference Model as described in "The Stratified Reference Model: An Open Architecture to B-ISDN" by T. Hadoung, B. Stavenow, J. Dejean, ISS'90, Stockholm. In FIG. 3 a schematic drawing of a B-ISDN network from the viewpoint of the Stratified Reference Model is illustrated (the protocol viewpoint to the left and the network viewpoint to the right). Accordingly, the B-ISDN will consist of the following strata. A transmission stratum based on SDH (Synchronous Digital Hierarchy) or equivalent (SONET) at the bottom, a cross connect stratum based on either SDH or ATM (Asynchronous Transfer Mode) on top of that, which acts as an infrastructure for the ATM VP/VC stratum with switched connections. Finally, the large set of possible applications uses the cross connect stratum as an infrastructure. In one particular embodiment of the present invention it is the infrastructure network modelling the cross connect stratum in a B-ISDN overlaid network that is considered. In general, this infrastructure network is referred to as a physical network.

Of course, it is to be understood that the present invention can be applied to any physical telecommunication network.

The physical transmission resources, i.e. the transmission capacities of the physical links, have to be partitioned or distributed among the logical links of said logical networks in some way. Since ATM has similarities with both packet switched and circuit switched networks it is not a priori obvious which properties should have the greatest impact on a partitioning or dimensioning model. In the data transfer phase the similarities to packet switched networks are the largest. However, at the connection setup phase the similarities to circuit switching dominate, especially if a preventive connection control concept with small ATM switch buffers has been adopted together with the equivalent bandwidth concept. In an approach which models the call scale phenomenon, it is natural to view an ATM network as a multirate circuit switched network in which the most important quality of service parameter is the connection blocking probability, i.e. the route blocking probability. In this context, there is provided a method in accordance with the present invention which designs the capacity values of the logical links of the various logical networks such that the route blocking probability on any route in any of the logical networks does not exceed a maximum allowed blocking value, given in advance for each route.

Figure 4:
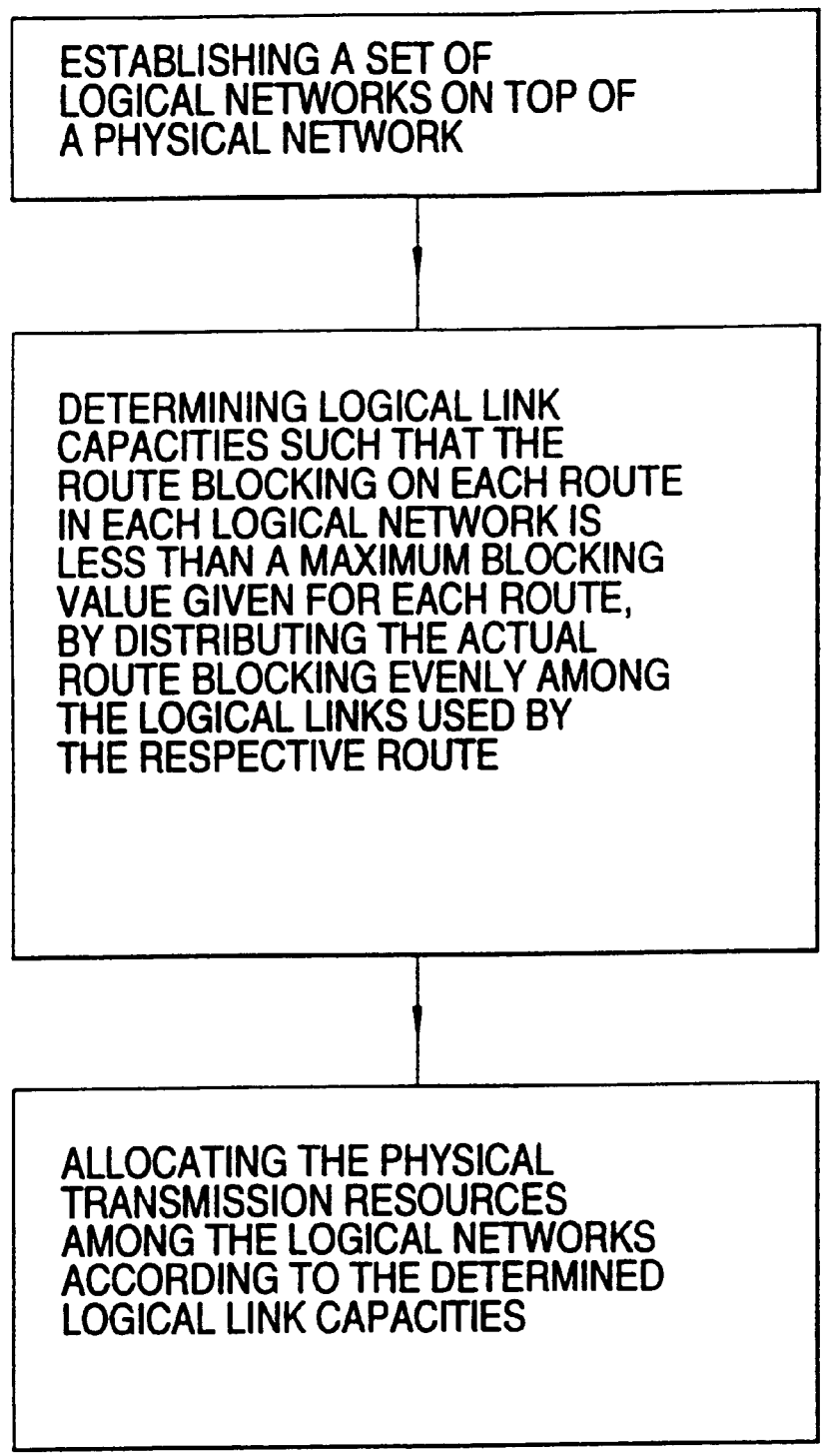
FIG. 4 is a schematic flow diagram illustrating a method in accordance with a general inventive concept of the present invention.

FIG. 4 shows a schematic flow diagram illustrating a method in accordance with a general inventive concept of the present invention. In accordance with the present invention a set of logical networks is established on top of a physical network comprising physical transmission and switching resources, said logical networks comprising nodes and logical links extending between the nodes so as to define the topology of said logical networks. Preferably, the logical networks are completely separated from each other. The logical links are used by routes interconnecting the nodes of node pairs in the logical networks. Logical link capacities are determined such that the route blocking probability on each individual route in each one of the logical networks is less than or equal to a maximum allowed blocking probability, given for each individual route, by distributing the actual route blocking evenly among the logical links used by the respective route. Finally, the physical transmission resources are allocated among the logical links of the logical networks according to the determined logical link capacities.

As indicated in FIG. 3 the cross connect stratum can be realized by either SDH or ATM. If the cross connect stratum is based on SDH and the infrastructure network is realizing e.g. different quality of service classes by resource separation, the partitioning can only be performed in integer portions of the STM modules of the SDH structure. On the other hand, if the cross connect is realized by ATM virtual paths then no integrality restriction exists and the partitioning can be performed in any real portions. Therefore, whether the cross connect stratum is based on SDH or ATM will have important implications for the partitioning of the physical network resources. The SDH cross connect solution gives rise to a model that is discrete with regard to the logical link capacities, while the ATM cross connect solution gives rise to a continuous model. The continuous model requires that the ATM switches support partitioning on the individual input and output ports. For example, this is realized by multiple logical buffers at the output ports. In a preferred embodiment of the invention an infrastructure network modelling the ATM cross connect stratum is considered while in an alternative embodiment an infrastructure modelling the SDH cross connect is considered, as can be seen in FIG. 1.

At the first glance it might appear that partitioning, as opposed to complete sharing, is a reduction of the full flexibility of ATM. This is however not the case if the partitioning is considered on a general level. On a conceptual level the complete sharing schemes, e.g. priority queuing, Virtual Spacing etc. tell us how to realize resource sharing on the cell level, while the partitioning approach seeks for the call scale characteristics, e.g. how to assign rates to various logical links, that is then to be realized on the cell level. In this sense the complete partitioning approach complements, rather than excludes, the complete sharing approaches.

Mathematical framework and dimensioning model

Consider a fixed physical network with N nodes and K physical links, on top of which a number of logically separated logical networks are established. If the total number of logical links over all logical networks is denoted by J, and the capacity of an individual logical link j is denoted $C_j$, then the vector of logical link capacities over all logical networks can be written as $C=(C_1, C_2, \ldots, C_j)$. These logical link capacities are not known in advance. In fact it is desired to dimension the logical links of the logical networks with respect to capacity.

The incidence of physical links and logical links is expressed by a K×J matrix S in which the j:th entry in the k:th row is equal to 1 if logical link j needs capacity on the k:th physical link, otherwise said entry is 0. Naturally, the sum of logical link capacities on the same physical link cannot exceed the capacity of the physical link. This physical constraint can be expressed as $$SC \leq C_{phys},$$

where C is defined above, and $C_{phys}$ refer to the vector of given physical link capacities. In addition it is required that $C \leq 0$.

Assume that I traffic types are carried in the complete network. The role of these traffic types is primarily to handle different bandwidth requirements, but traffic types can be distinguished also with respect to different holding times or even priorities (trunk reservation). By convention, each route carries only a single type of traffic. This means that if several traffic types are to be carried, they are represented by parallel routes.

Let R be the total set of routes over all logical networks, that is, $$R = \bigcup_v \bigcup_p \bigcup_i R^{(v,p,i)} \quad (1)$$

where $R^{(v,p,i)}$ is the set of routes in logical network $v$ realizing communication between node pair p regarding traffic type i. It is important to understand that a route is not associated with more than one logical network. Each logical network is assumed to operate under fixed non-alternate routing.

Let $\kappa_r$ be the Poissonian call arrival rate to route r, let $1/\mu_r$ be the average holding time of calls on route r and let $v_r = \kappa_r/\mu_r$ be the offered traffic to route r. Let $v_{(v,p,i)}$ be the aggregated offered traffic of type i to node pair p in logical network $v$. In a preferred embodiment the offered traffic for each route in each logical network is given while in another preferred embodiment of the invention the above aggregated offered traffic is given for all logical networks, node pairs and traffic types. In the latter case, the load is e.g. distributed on shortest paths.

Let $B_j$ be the blocking probability of logical link j. Further, let L(r) be the set of logical links used by route r and denote by l(r) the length of route r, i.e. the number of logical links on route r.

In addition, there is assumed for each route r in each one of the logical networks a maximum allowed route blocking probability B(r) to be given.

The dimensioning task is to design the logical link capacities $C_j$ for all j such that the route blocking requirements are satisfied, i.e. such that the route blocking on any route r does not exceed B(r).

In accordance with a preferred embodiment of the present invention the dimensioning is performed based on equivalent link blocking (ELB). The idea is to distribute, for each individual route, the route blocking probability evenly among the logical links used by the individual route. Of course, a route may comprise a single logical link. In this case, the link blocking and the route blocking are the same.

Adopting the equivalent link blocking assumption, the probability that a call on route r is not blocked can now be expressed as $(1-B_j)^{l(r)}$. Considering the route blocking requirements, the minimum probability that a call on route r is not blocked is equal to 1-B(r). If the route blocking requirements or constraints as defined above are to be satisfied then the following must hold for each route r and each logical link $j \in L(r)$:

$$1-B(r) \leq (1-B_j)^{l(r)} \quad (1)$$

If $R_j$ denotes the set of routes that use logical link j and if the B(r) values are different for these routes, then the lowest value of B(r), $r \in R_j$, is taken into account. In other words, the strictest requirement on route blocking is considered. Now, the following condition is obtained:

$$\max_{r \in r_j}(1-B(r)) \leq (1-B_j)^{l(r)} \quad (2)$$

This can also be expressed as:

$$1-B_j \leq \max_{r \in R_j}(1-B(r))^{1/l(r)} \quad (3)$$

or as:

$$B_j \leq 1 - \max_{r \in R_j}(1-B(r))^{1/l(r)} \quad (4)$$

This means that the maximum possible value for the blocking probability on logical link j, under the assumption of evenly distributed blocking, can be expressed as follows:

$$B_j^{max} = 1 - \max_{r \in R_j}(1 - B(r))^{1/l(r)} \quad (5)$$

Once the maximum possible value for the link blocking probability is calculated for each logical link in each one of the logical networks, the offered traffic to logical link j can be approximated as:

$$\rho_j = \sum_{r \in R_j} A_{jr} v_r \prod_{i \neq j} (1 - B_i^{max})^{A_{ir}} \quad (6)$$

where $A_{jr}$ is the amount of bandwidth that route r requires on logical link j. If route r does not traverse logical link j then $A_{jr}$ is equal to zero.

Since the value of $B_j^{max}$ and the corresponding value of $\rho_j$ are known for all j, the capacity $C_j$ of logical link j can be calculated for all j by inverting numerically a blocking function:

$$B_j^{max} = E(\rho_j, C_j) \quad (7)$$

Preferably, the simple analytic extension of Erlang's B-formula to any non-negative real value is used as blocking function. However, to preserve generality, any blocking function is allowed, that is jointly smooth in all variables.

Having obtained the logical link capacities $C_j$ from the above model, it is necessary to normalize them such that they satisfy the physical capacity constraints, $SC \leq C_{phys}$. If the capacity of the physical link k is $C_k^{phys}$, and the capacities of the logical links that need capacity on the k:th physical link are $C_{k1}, \ldots, C_{kn}$, then the normalized logical link capacities associated with physical link k are $$\hat{C}_{ki} = \frac{C_{ki}}{\sum_{l=1}^{n} C_{kl}} C_k^{phys}, \quad i = 1, \ldots, n \quad (8)$$

This normalization procedure is performed for all k.

The normalized logical link capacities satisfy the requirements on route blocking for each route in each one of the various logical networks. In other words, if the physical transmission resources are allocated among the logical links of the logical networks in accordance with the above normalized logical link capacities, then the blocking probability of any route r does not exceed B(r).

An efficient way of handling the co-existence of many different bandwidth demands (traffic types) is to model a non-unity bandwidth call by a sequence of independent unity bandwidth calls. In the article "Blocking Probabilities in Multitraffic Loss Systems: Insensitivity, Asymptotic Behavior and Approximations" by Labourdette and Hart in *IEEE Trans. Communications,* 40 (1992/8) pp. 1355–1366. it is proven that this approximation is correct in the asymptotic sense.

Figure 5:
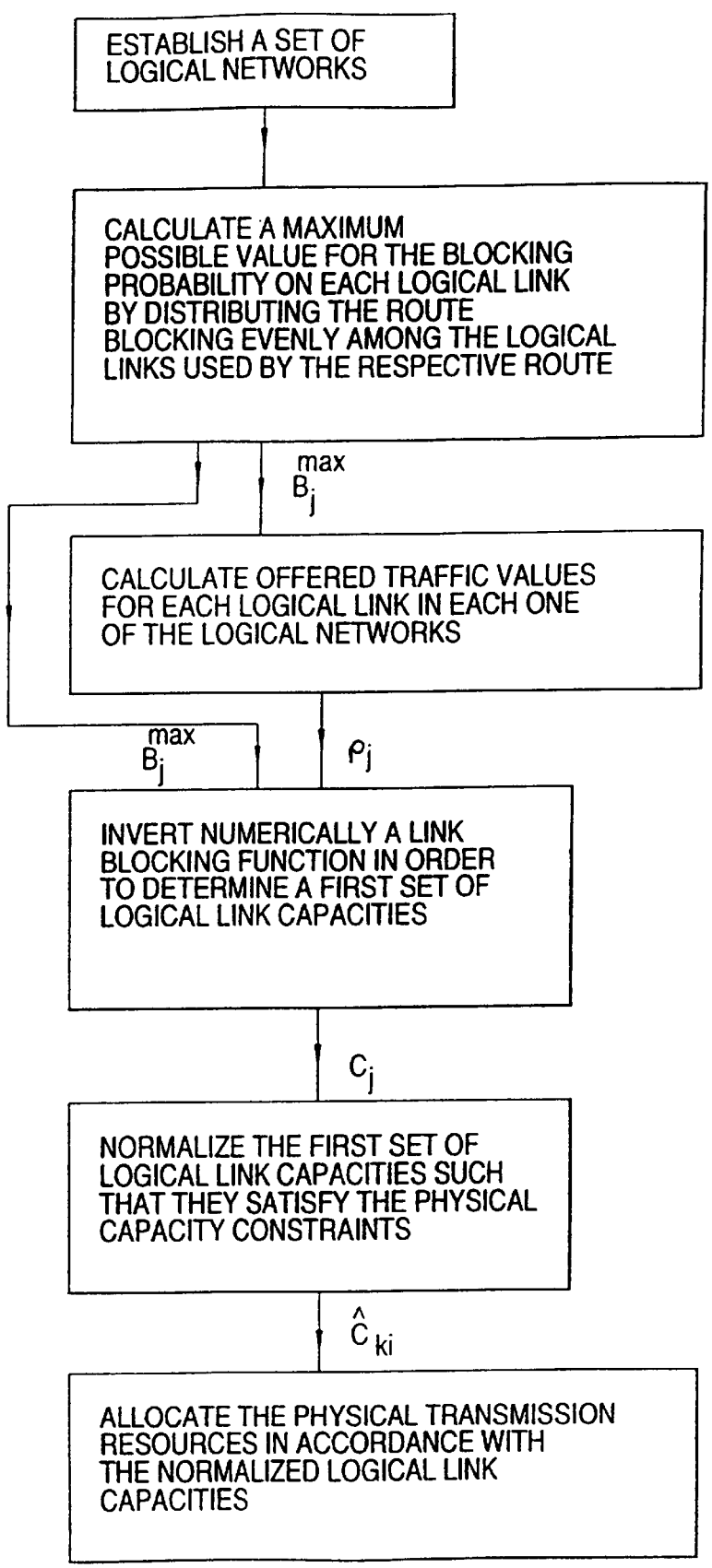
FIG. 5 is a flow diagram illustrating, in more detail, a method in accordance with a first preferred embodiment of the invention.

For a better understanding of the present invention a method in accordance with a preferred embodiment of the invention will be described with reference to the flow diagram of FIG. 5. First, a set of logical networks is established on top of a physical network by associating different parts of the traffic with different parts of the physical transmission and switching resources. Next, the maximum possible value for the blocking probability on each logical link in each one of the logical networks is calculated, given the maximum allowed blocking probability $B(r)$ for each individual route in each one of the logical networks, by distributing the route blocking evenly among the logical links that are used by the respective route (expression (5)). Then, the offered traffic corresponding to the calculated maximum link blocking probability is calculated for each logical link (expression (6)). Following this, a first set of logical link capacities associated with the various logical networks is determined by inverting numerically a continuous link blocking function (expression (7)) using the results of the previous steps as input variables. This first set of logical link capacities is normalized (expression (8)) such that the physical capacity constraints are satisfied. Finally, the physical transmission resources of the physical network are allocated among the logical links of the logical networks in accordance with the normalized logical link capacities.

In general, the method and device according to the invention is utilized to dimension the logical links of each one of the logical networks by considering route blocking requirements. The present invention does not optimize the network operation, the total carried traffic or network revenue, it only dimensions the logical networks taking into account the requirements on route blocking probabilities. If the overall blocking in a network system is low, then implicitly the total carried traffic will be high. Thereby, the invention considers the total carried traffic or network revenue in an indirect way.

It should be understood by those skilled in the art that it is equally possible to dimension only one of the logical networks. If e.g. only one logical network among the set of logical networks established on top of the physical network is associated with the requirement that the route blocking probability on the routes in the logical network should not exceed a maximum value given for each route, then, in one embodiment, the capacities of only those logical links that belong to this particular logical network are determined.

If the cross connect is based on SDH, the partitioning can only be performed in integer portions of the STM modules of the SDH structure, as mentioned above. In this particular case, the real capacity values obtained from the method according to the first preferred embodiment of the invention are preferably rounded into integer values such that the physical constraints and the quality of service constraints are satisfied. In one embodiment of the invention this is realized by independently repeated random rounding trials.

The method according to the first preferred embodiment of the invention is preferably performed by one or more control programs CP of the control program module CPM of the operation and support system OSS. These control programs, in turn, are executed by one or more of the processors in the processor system PS described above. The operation and support system OSS collects the required information from the network system and uses this information together with the database DB and control program CP information as input to the respective control programs CP. Furthermore, the OSS controls the network switches through the data links so as to partition the physical link capacities among the logical links of the logical networks.

Figure 6:
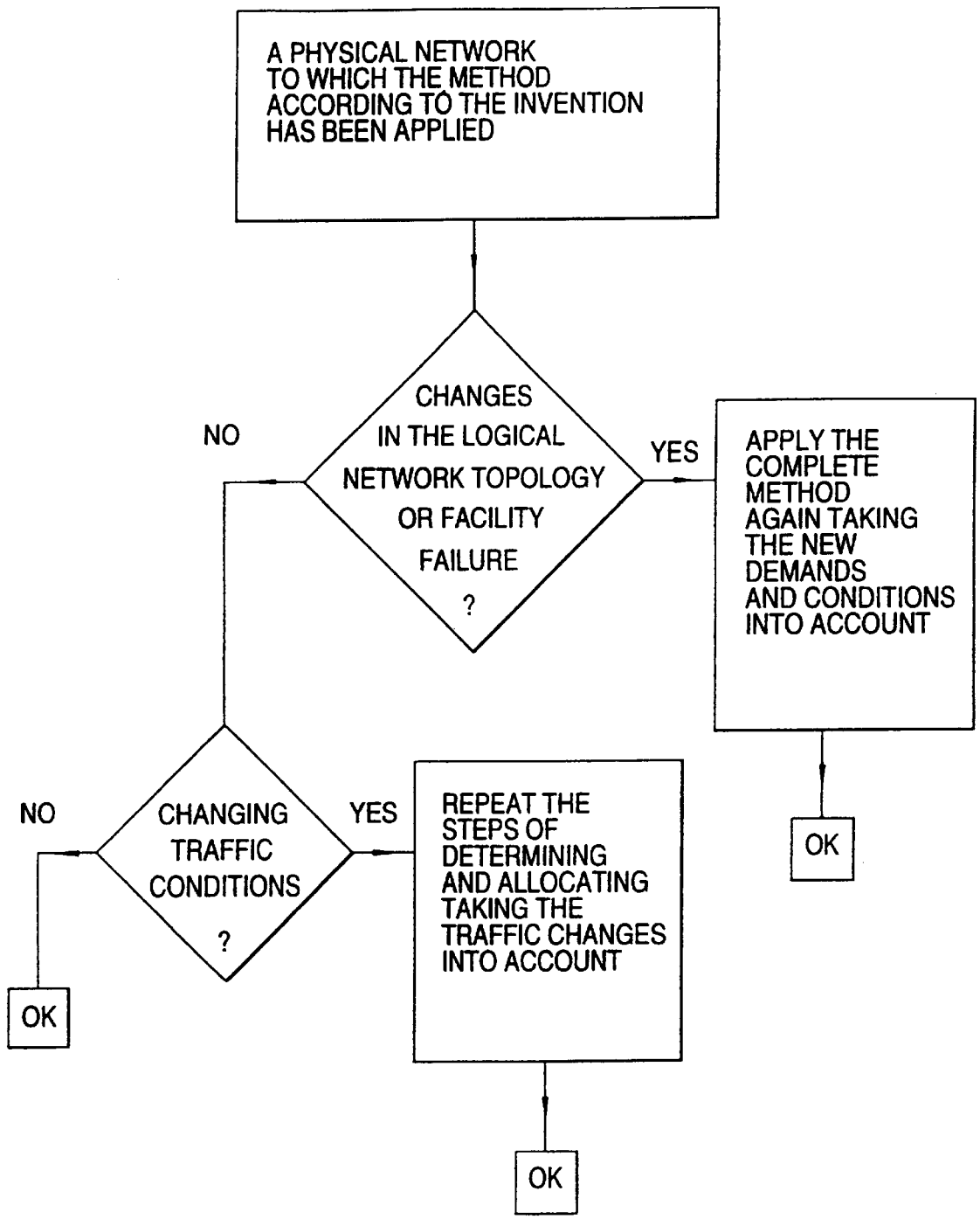
FIG. 6 is a schematic flow diagram illustrating how the method in accordance with a first preferred embodiment of the present invention flexibly adapt the overall network system to changing traffic conditions, but also to facility failures and demands for new logical network topologies.

Accordingly, the network manager can flexibly and very quickly adapt the overall network system to changing traffic conditions, such as changes in offered traffic, but also to facility failures and new demands on the logical network topology from e.g. business users, as is illustrated in the schematic flow diagram of FIG. 6. Once the method or device according to the invention has been applied to a physical network, then a set of logical networks is established and the logical links of these logical networks are dimensioned such that the route blocking requirement is satisfied for each route in each one of the logical networks. However, if, at a later time, the topology of one or more logical networks have to be changed for some reason (facility failure or demands for new topologies) or additional logical networks are requested, then the complete set of steps according to the first preferred embodiment of the present invention has to be performed in order to reconfigure the overall network. If no changes regarding the topology of the logical networks is necessary, but e.g. the offered traffic varies, then only the determining and allocating steps of the present invention have to be carried out. That is, the determining step and the allocating step are repeated in response to changing traffic conditions so as to change the logical link capacities of the various logical networks such that the route blocking on any route r is at most $B(r)$. This alteration of the logical link capacities is realized by the switches and cross connect devices of the physical network in a very short period of time. Thus, the realization of the present invention renders the operation of the complete physical network both safe and flexible.

Since the method according to a preferred embodiment of the invention does not involve iterative calculations, the computational complexity is very small. Of course, there is a trade-off between the accuracy of the result and the required computational power.

The method according to the present invention offers a fast solution to the otherwise very complicated resource partitioning problem. The solution can be recomputed easily so as to dynamically follow changing network conditions.

Note that the accompanying drawings are simple illustrative examples illustrating the inventive concept of the present invention. In practice, the physical network and the logical networks are, in general, very extensive with e.g. intermediate logical nodes which are not directly associated with access points and logical links using more than one physical link.

The embodiments described above are merely given as examples, and it should be understood that the present invention is not limited thereto. It is of course possible to embody the invention in specific forms other than those described without departing from the spirit of the invention. Further modifications and improvements which retain the basic underlying principles disclosed and claimed herein are within the scope and spirit of the invention.

Experimental results

The present invention has been tested on various networks. In particular, the invention was tried on a 6-node physical network on top of which five different logical networks, each with four traffic classes, were established. The distribution of traffic among the traffic classes and the homogeneity of bandwidth demands were varied and the total carried traffic or network revenue was measured. For not too inhomogeneous traffic conditions the approach was satisfactory. In addition, even for unbalanced distribution of traffic among the traffic classes the performance was good.

What is claimed is:

1. In a physical network having physical transmission and switching resources, a method for partitioning the physical transmission resources among logical networks, the method comprising the steps of:

establishing a set of logical networks on top of the physical network, wherein the logical networks include nodes and logical links, and the logical links are used by routes interconnecting the nodes of node pairs in the logical networks;

determining logical link capacities of the logical links; and allocating the physical transmission resources among the logical links of the logical networks according to determined logical link capacities;

wherein the step of determining logical link capacities is performed under the constraint that the route blocking probability of each route in each logical network is required to be less than or equal to a maximum allowed blocking probability for each individual route, and performed under a distribution, for each route, of the route blocking probability evenly among the logical links used by the individual route.

2. The method of claim 1, wherein the determining step and the allocating step are repeated in response to changing traffic conditions so as to adapt the partitioning of the physical transmission resources to the prevailing traffic.

3. The method of claim 1, wherein the step of determining logical link capacities is performed, for each individual logical link, based on a lowest value of the maximum allowed route blocking probabilities that are associated with the routes that use the individual logical link.

4. The method of claim 1, wherein the establishing step comprises the step of controlling a port assignment of the physical switching resources.

5. The method of claim 1, wherein the step of allocating comprises the step of using logical buffers at output ports of the physical switching resources.

6. The method of claim 1, wherein the physical network is an infrastructure network modeling an asynchronous transfer mode cross connect stratum in a B-ISDN overlaid network.

7. The method of claim 1, wherein the determining step comprises the step of calculating, for each logical link, a maximum value for the blocking probability on the individual logical link, taking a lowest value of the maximum allowed blocking probabilities that are associated with the routes that use the individual logical link into account, the calculating step being performed under an even distribution of route blocking.

8. The method of claim 7, wherein the determining step further comprises the step of calculating, for each logical link, a value representative of the offered traffic to the logical link given the calculated maximum possible link blocking probabilities.

9. The method of claim 7, wherein information, for each route, about the logical links that are used by the route are input data.

10. The method of claim 8, wherein route offered traffic values and values representative of a bandwidth that each route requires on each logical link are input data for calculating the offered traffic representing values.

11. The method of claim 8, wherein the determining step further comprises the step of inverting numerically a link blocking function using the calculated maximum possible link blocking probability values and the calculated offered traffic representing values as input variables so as to generate first logical link capacities.

12. The method of claim 11, wherein the determining step further comprises the step of normalizing the first logical link capacities such that they satisfy physical capacity constraints so as to generate the logical link capacities.

13. In a physical network having physical transmission and switching resources, a method for partitioning the physical transmission resources among logical links, the method comprising the steps of:

establishing logical nodes and the logical links on top of the physical network, wherein the logical links are used by routes interconnecting nodes of node pairs;

determining logical link capacities; and allocating the physical transmission resources among the logical links according to the determined logical link capacities;

wherein the step of determining logical link capacities is performed under the constraint that the route blocking probability on each individual route is required to be less than or equal to a maximum allowed blocking probability for each individual route, and performed under a distribution, for each individual route, of the route blocking probability evenly among the logical links used by the individual route.

14. In a physical network having physical transmission resources, a device for partitioning the physical transmission resources among logical networks, the device comprising:

means for establishing a set of logical networks on top of the physical network, wherein the logical networks include nodes and logical links, and the logical links are used by routes interconnecting nodes;

means for determining logical link capacities; and means for allocating the physical transmission resources among the logical links of the logical networks according to the determined logical link capacities;

wherein the determining means determines the logical link capacities under the constraint that the route blocking probability on each individual route in each logical network is required to be less than or equal to a maximum allowed blocking probability for each individual route, and under a distribution, for each individual route, of the route blocking probability evenly among the logical links used by the individual route.

15. The device of claim 14, wherein the establishing means comprises means for controlling a port assignment of the physical switching resources.

\* \* \* \* \*